US012537293B2

(12) United States Patent
Lee et al.

(10) Patent No.: US 12,537,293 B2
(45) Date of Patent: Jan. 27, 2026

(54) ANTENNA BOARD

(71) Applicant: SAMSUNG ELECTRO-MECHANICS CO., LTD., Suwon-si (KR)

(72) Inventors: Yangje Lee, Suwon-si (KR); Jesang Park, Suwon-si (KR); Changgun Oh, Suwon-si (KR); Hyun Kyung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 137 days.

(21) Appl. No.: 18/386,462

(22) Filed: Nov. 2, 2023

(65) Prior Publication Data

US 2024/0275035 A1 Aug. 15, 2024

(30) Foreign Application Priority Data

Feb. 15, 2023 (KR) ........................ 10-2023-0020326

(51) Int. Cl.
*H01Q 1/42* (2006.01)
*H01Q 9/04* (2006.01)
*H01Q 1/38* (2006.01)

(52) U.S. Cl.
CPC ........... *H01Q 1/422* (2013.01); *H01Q 9/0414* (2013.01); *H01Q 1/38* (2013.01)

(58) Field of Classification Search
CPC .............. C12N 15/113; C12N 2310/11; C12N 2310/14; C12N 2310/20; C12N 2310/531; C12N 2320/12; G16B 20/30; G16B 20/50; G16B 25/10; H01Q 1/2283; H01Q 1/38; H01Q 1/405; H01Q 1/422; H01Q 21/08; H01Q 9/0414
See application file for complete search history.

(56) References Cited

U.S. PATENT DOCUMENTS

| | | | | |
|---|---|---|---|---|
| 2007/0200767 A1* | 8/2007 | Yoshioka | H01Q 1/38 | 343/700 MS |
| 2010/0311355 A1* | 12/2010 | Rofougaran | G01S 13/06 | 455/91 |
| 2015/0200460 A1* | 7/2015 | Isom | H01Q 21/0087 | 29/601 |

(Continued)

FOREIGN PATENT DOCUMENTS

| | | |
|---|---|---|
| KR | 10-2008-0081704 A | 9/2008 |
| KR | 10-2021-0147323 A | 12/2021 |

*Primary Examiner* — Thien M Le
(74) *Attorney, Agent, or Firm* — Morgan, Lewis & Bockius LLP

(57) ABSTRACT

An antenna board according to an embodiment includes: a first insulating layer having a first relative dielectric constant; at least one first antenna member that is disposed inside the first insulating layer and has a first main surface with a maximum area; a second insulating layer that is disposed adjacent to the first insulating layer and has a second relative dielectric constant that is higher than the first relative dielectric constant; and at least one second antenna member that is disposed inside the second insulating layer and has a second main surface that has a maximum area and is disposed to such that the main surface of the second antenna member faces toward a plane which is 90 degree or less from the first main surface.

18 Claims, 5 Drawing Sheets

(56) References Cited

U.S. PATENT DOCUMENTS

| | | | | |
|---|---|---|---|---|
| 2017/0250474 | A1 | 8/2017 | Zeine | |
| 2018/0248254 | A1* | 8/2018 | Islam | H01Q 19/13 |
| 2021/0143526 | A1* | 5/2021 | Tate | H01Q 1/2283 |
| 2021/0318730 | A1* | 10/2021 | Lee | H01Q 21/061 |
| 2021/0376473 | A1 | 12/2021 | Lee et al. | |
| 2022/0131571 | A1* | 4/2022 | Lukyanov | H01Q 1/38 |
| 2023/0395981 | A1* | 12/2023 | Contopanagos | H01Q 21/065 |
| 2024/0260175 | A1* | 8/2024 | Lee | H01Q 1/38 |
| 2024/0291168 | A1* | 8/2024 | Kim | H01Q 21/245 |
| 2025/0040032 | A1* | 1/2025 | Shin | H05K 3/4697 |

* cited by examiner

ANTENNA BOARD

CROSS-REFERENCE TO RELATED APPLICATION

This application claims priority to and the benefit of Korean Patent Application No. 10-2023-0020326 filed in the Korean Intellectual Property Office on Feb. 15, 2023, the entire contents of which are incorporated herein by reference.

TECHNICAL FIELD

The present disclosure relates to an antenna board. Data traffic of mobile communication is rapidly increasing every year. Technological development is in progress to support the rapidly increasing data in real time in a wireless network. For example, applications such as contents of Internet of thing (IoT)-based data, augmented reality (AR), virtual reality (VR), live VR/AR combined with social networking service (SNS), autonomous driving, sync view (transmission of a real-time image of a user's point of view using an ultra-small camera), and the like need communication for supporting transmission and reception of a large amount of data. Therefore, millimeter wave (mmWave) communication including 5th generation (5G) communication has recently been researched, and research for commercialization and standardization of an antenna board smoothly implementing the millimeter wave communication is also being performed.

In the antenna board applied to the 5G communication, due to strong straightness of the 5G communication, sensitivity of a 5G signal varies depending on a direction of an antenna. Therefore, a plurality of antenna boards are disposed in different directions or some antenna boards are vertically disposed. In particular, when the antenna board is disposed horizontally or vertically, a horizontal antenna board and a vertical antenna board have to be connected to each other with a separate flexible printed circuit (FPC) board or a cable. Thus, signal loss may occur, and manufacturing cost may increase.

The above information disclosed in this background section is only for enhancement of understanding of the background of the disclosure, and therefore it may contain information that does not form the prior art that is already known in this country to a person of ordinary skill in the art.

SUMMARY

The present disclosure provides an antenna board capable of minimizing signal loss and being manufactured in a small size.

However, problems to be solved by the embodiments of the present disclosure are not limited to the above-described problem and may be variously extended in a range of technical ideas included in the embodiments.

An antenna board according to some embodiments includes: a first insulating layer having a first relative dielectric constant; at least one first antenna member that is disposed inside the first insulating layer and has a first main surface with a maximum area; a second insulating layer that is disposed adjacent to the first insulating layer and has a second relative dielectric constant that is higher than the first relative dielectric constant; and at least one second antenna member that is disposed inside the second insulating layer and has a second main surface that has a maximum area and is disposed to face toward a plane which is 90 degree or less from the first main surface.

The second relative dielectric constant may be 6 to 10.

The first antenna member may include a patch-type antenna.

The second main surface of the second antenna member may be perpendicular to the first main surface of the first antenna member.

The second antenna member may have an auxiliary surface having an area that is smaller than that of the second main surface.

The second antenna member may include a plurality of conductors stacked in a first direction perpendicular to the first main surface.

The plurality of conductors may include: a plurality of conductive pattern layers spaced apart from each other in the first direction; and a plurality of conductive via layers respectively disposed between the adjacent conductive pattern layers.

A thickness of the conductive pattern layer extending in the first direction may be smaller than a length of the conductive pattern layer extending in a second direction perpendicular to the first direction.

The antenna board may further include: a first circuit wire that is disposed inside the first insulating layer and transfers an electrical signal; and a second circuit wire that is disposed inside the second insulating layer and transfers an electrical signal.

An antenna board according to another embodiment includes: a first insulating layer having a first relative dielectric constant; at least one first antenna member that is disposed inside the first insulating layer and has a first main surface with a maximum area; a second insulating layer that is disposed adjacent to the first insulating layer and has a second relative dielectric constant equal to the first relative dielectric constant; at least one second antenna member that is disposed inside the second insulating layer and has a second main surface that has a maximum area and is disposed such that the main surface of the second antenna member faces toward a plane which is 90 degree or less from the first main surface; and a third insulating layer that is disposed adjacent to the first insulating layer or the second insulating layer and has a third relative dielectric constant lower than the second relative dielectric constant.

The second relative dielectric constant may be 6 to 10.

The first antenna member may include a patch-type antenna.

The second main surface of the second antenna member may be perpendicular to the first main surface of the first antenna member.

The second antenna member may have an auxiliary surface having an area that is smaller than that of the second main surface.

The second antenna member may include a plurality of conductors stacked in a first direction perpendicular to the first main surface.

According to the embodiments, an overall thickness of an antenna board may be reduced by minimizing a thickness of a vertical antenna so that the antenna board is easily applied to a small portable device.

In addition, since the vertical antenna is implemented without a separate flexible printed circuit (FPC) board or a cable, signal loss and manufacturing cost may be minimized.

It is obvious that an effect of the embodiments of the present disclosure is not limited to the above-described effect, and may be variously extended without departing from the spirit and scope of the present disclosure.

DETAILED DESCRIPTION OF THE EMBODIMENTS

Figure 1:
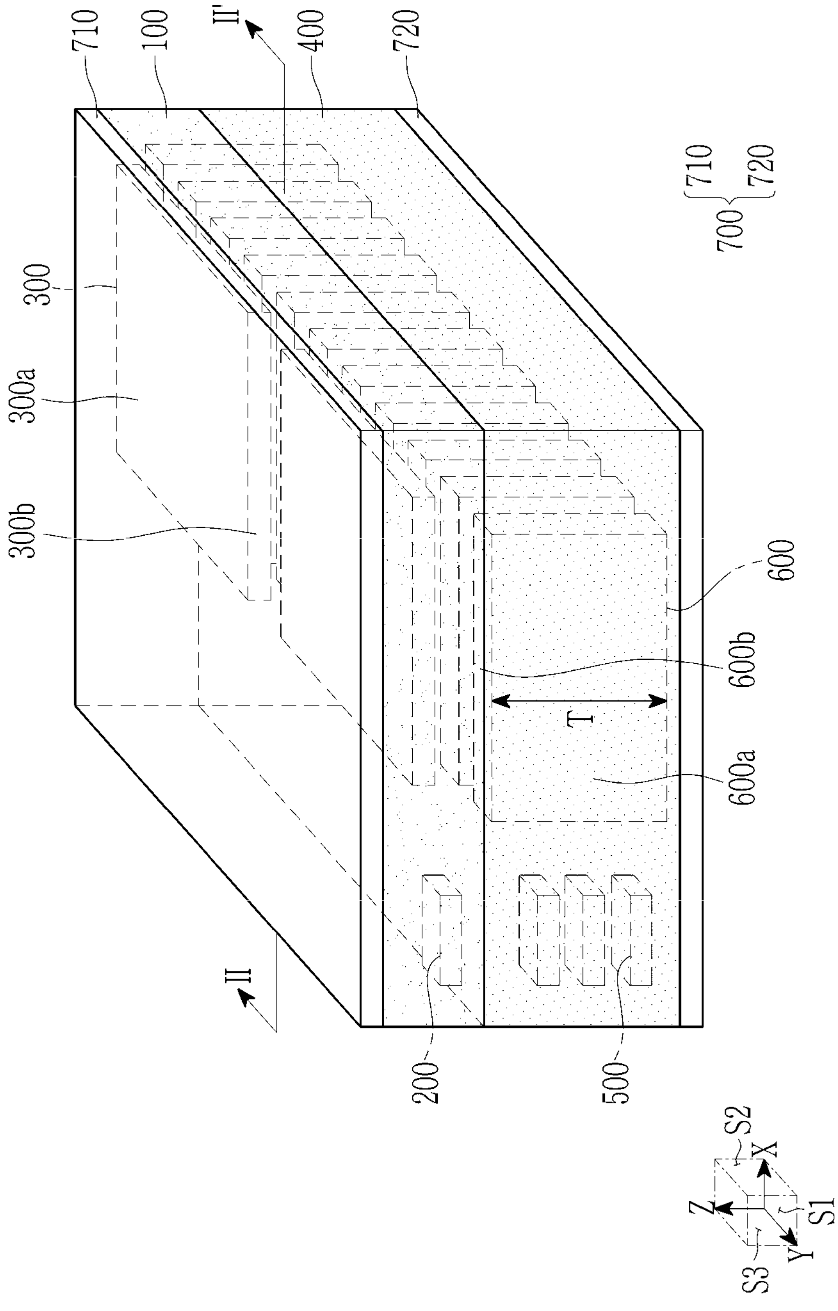
FIG. 1 is a schematic perspective view of an antenna board according to an embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts or portions that are irrelevant to the description are omitted, and identical or similar constituent elements throughout the specification are denoted by the same reference numerals.

Further, the accompanying drawings are provided only in order to allow embodiments disclosed in the present specification to be easily understood and are not to be interpreted as limiting the embodiments disclosed in the present specification, and it is to be understood that the present disclosure includes all modifications, equivalents, and substitutions without departing from the scope and spirit of the present disclosure.

Further, in the drawings, the size and thickness of each element are arbitrarily illustrated for ease of description, and the present disclosure is not necessarily limited to those illustrated in the drawings. In the drawings, the thickness of layers, films, panels, regions, etc., are exaggerated for clarity. In the drawings, for ease of description, the thicknesses of some layers and areas are exaggerated.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Furthermore, throughout the specification, "connected" does not only mean when two or more elements are directly connected, but also when two or more elements are indirectly connected through other elements, and when they are physically connected or electrically connected, and further, it may be referred to by different names depending on a position or function, and may also be referred to as a case in which respective parts that are substantially integrated are linked to each other.

Hereinafter, various embodiments and variations will be described in detail with reference to the drawings.

An antenna board according to some embodiments will be described with reference to FIGS. 1 to 3.

Figure 2:
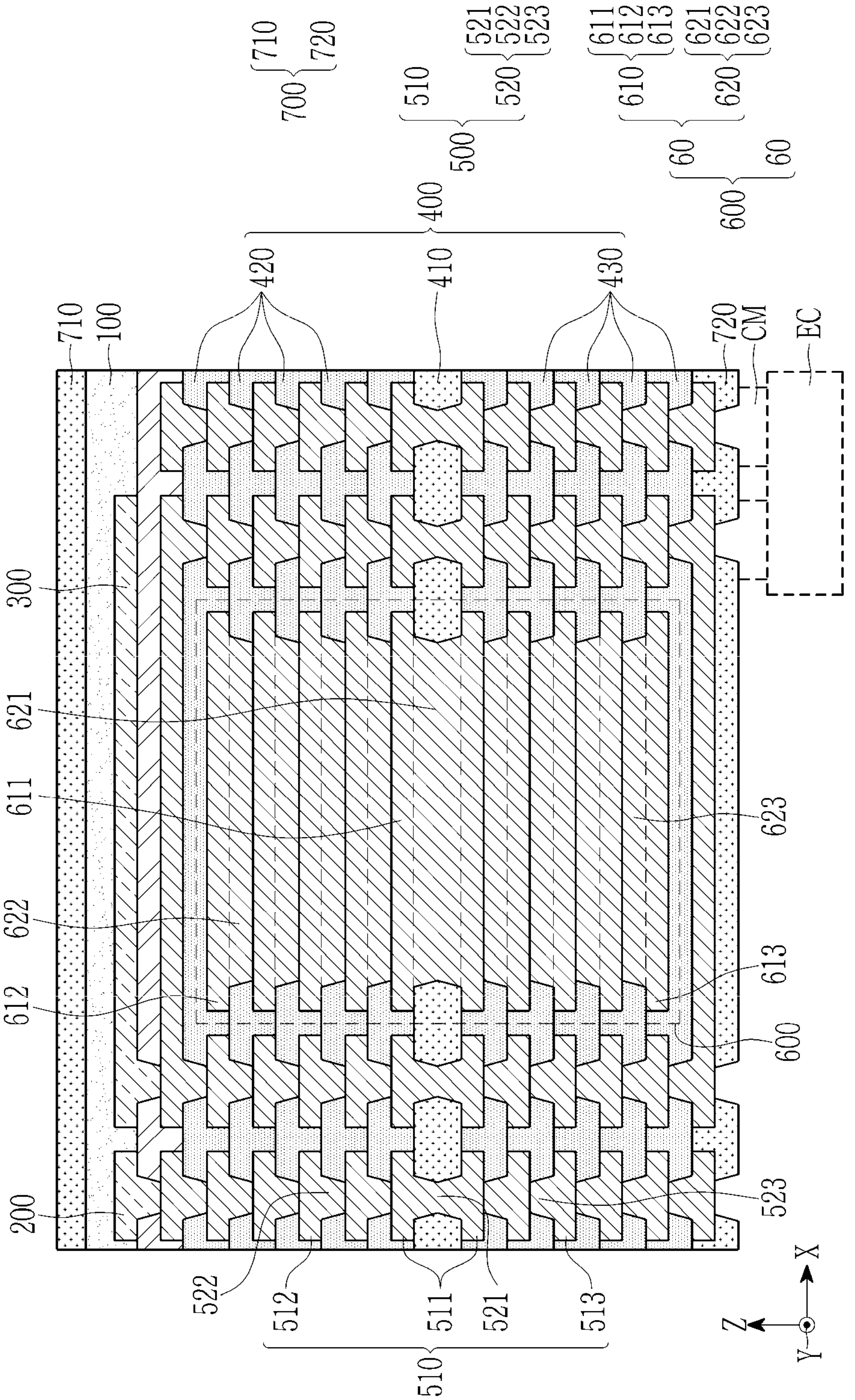
FIG. 2 is a cross-sectional view taken along a line II-II' of FIG. 1.
Figure 3:
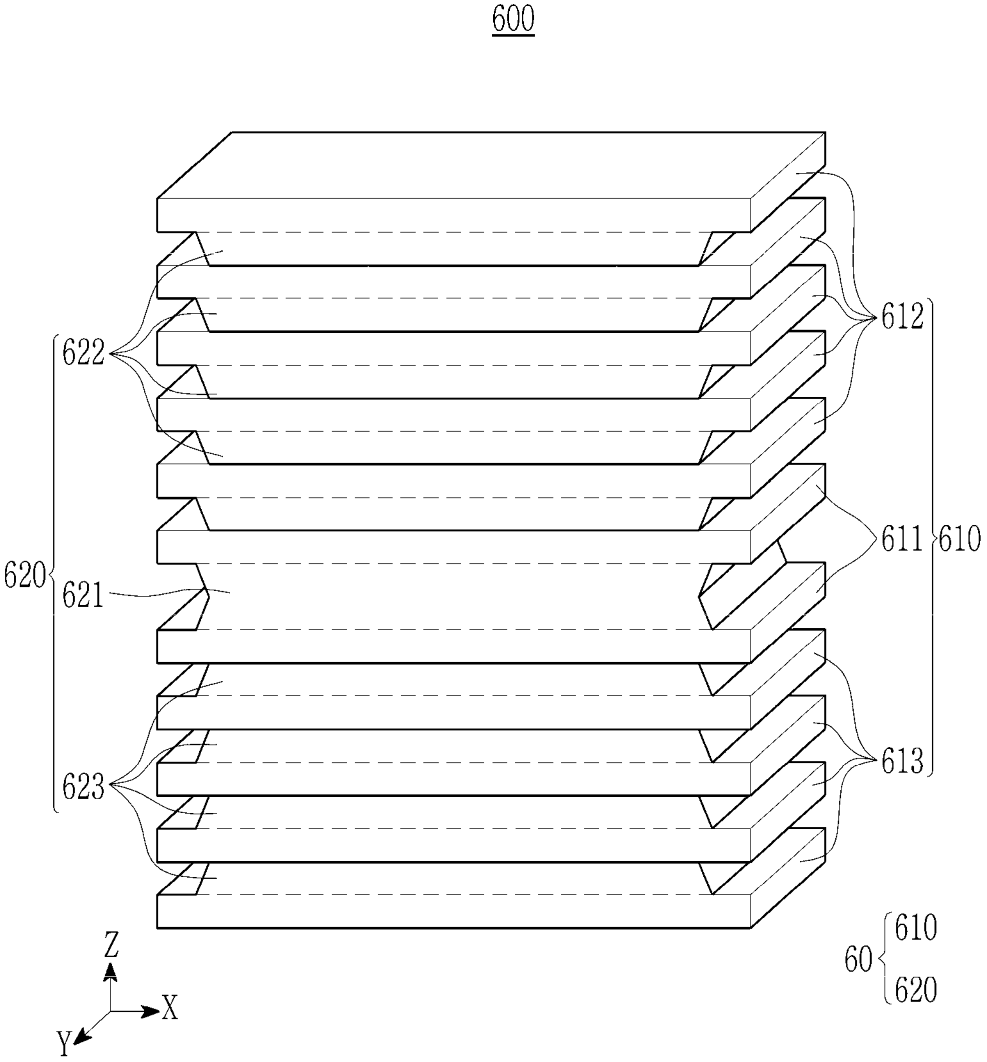
FIG. 3 is an enlarged perspective view of a second antenna member of FIG. 2.

FIG. 1 is a schematic perspective view of an antenna board according to an embodiment, FIG. 2 is a cross-sectional view taken along a line II-II' of FIG. 1, and FIG. 3 is an enlarged perspective view of a second antenna member of FIG. 2.

As shown in FIGS. 1 to 3, the antenna board according to some embodiments includes a first insulating layer 100, a plurality of first circuit wires 200, a plurality of first antenna members 300, a second insulating layer 400, a plurality of second circuit wires 500, a plurality of second antenna members 600, and a protective layer 700.

The first insulating layer 100 may include a thermosetting resin such as an epoxy resin, a polyimide, or combinations thereof, a thermoplastic resin such as polyethylene (PE), polycarbonate (PC), polyvinyl chloride (PVC), or combinations thereof, a resin including the thermosetting resin, the thermoplastic resin, and a reinforcing material such as a glass fiber or an inorganic filler, or combinations thereof. For example, the first insulating layer 100 may include a prepreg, an Ajinomoto buildup film (ABF), a photo imageable dielectric (PID), or combinations thereof. A dielectric loss factor (Df) may be adjusted according to a type of the resin included in the first insulating layer 100, a type of the filler included in the resin, a content of the filler, or combinations thereof. The dielectric loss factor (Df) is a value for dielectric loss, and the dielectric loss means electric power loss generated when an alternating current electric field is formed in a dielectric. The dielectric loss factor (Df) is proportional to the dielectric loss, and the smaller the dielectric loss factor (Df), the smaller the dielectric loss. An insulating layer having a low dielectric loss characteristic is advantageous in terms of reducing loss when the insulating layer having the low dielectric loss characteristic transmits a high frequency signal. A first relative dielectric constant (Dk1) of the first insulating layer 100 may be 3.5 or less.

The first circuit wire 200 may be disposed within the first insulating layer 100, and may transfer an electrical signal. The first circuit wire 200 may be disposed in various patterns. The first circuit wire 200 may include a conductive material such as copper (Cu), aluminum (Al), silver (Ag), tin (Sn), gold (Au), nickel (Ni), lead (Pb), titanium (Ti), an alloy thereof, or combinations thereof.

In the present embodiment, the first circuit wire 200 is illustrated as one layer, but the present disclosure is not limited thereto, and the first circuit wire 200 may be a plurality of layers.

Here, for convenience of description, an X-Y plane parallel to an upper surface of the first insulating layer 100 is defined as a first plane S1, an X-Z plane perpendicular to the first plane S1 is defined as a second plane S2, and an X-Z plane perpendicular to the first plane S1 and the second plane S2 is defined as a third plane S3.

The first antenna member 300 may be a horizontal antenna disposed inside the first insulating layer 100 and disposed on the first plane S1 parallel to the upper surface of the first insulating layer 100. The first antenna member 300 may include a patch-type of antenna having a predetermined width (W) in the X direction or Y direction. The first antenna member 300 may have a plurality of surfaces (or a plurality of faces), and may have a first main surface 300a having a maximum area among the plurality of surfaces and a first auxiliary surface 300b that is a side surface adjacent to the first main surface 300a and has a smaller area than that of the first main surface 300a.

In the present embodiment, the plurality of first antenna members 300 are disposed on the same first plane S1, but the present disclosure is not necessarily limited thereto, and an embodiment in which the plurality of first antenna members 300 are disposed to be spaced apart from each other along a first direction Z is also possible.

The second insulating layer 400 may be adjacent to and underneath of the first insulating layer 100 in the Z direction. However, the present disclosure is not necessarily limited thereto, and the second insulating layer 400 may be adjacent to the first insulating layer 100 to be disposed above.

The second insulating layer 400 may include a core insulating layer 410, and a plurality of first build-up insulating layers 420 and a plurality of second build-up insulating layers 430 disposed at both sides of the core insulating layer 410, respectively, along the first direction Z. The core insulating layer 410 may be thicker than a thickness of each of the first build-up insulating layers 420, and may be thicker than a thickness of each of the second build-up insulating layers 430. However, a structure of the second insulating layer 400 is not limited thereto, and may have a form of a coreless board in which the core insulating layer 410 is omitted.

The second insulating layer 400 may include a thermosetting resin such as an epoxy resin, a polyimide, or combinations thereof, a thermoplastic resin such as polyethylene (PE), polycarbonate (PC), polyvinyl chloride (PVC), or combinations thereof, a resin including the thermosetting resin, the thermoplastic resin, and a reinforcing material such as a glass fiber or an inorganic filler, or combinations thereof.

The second insulating layer 400 may be made of a high dielectric constant material having a higher relative dielectric constant than that of the first insulating layer 100. That is, a second relative dielectric constant (Dk2) of the second insulating layer 400 may be higher than the first relative dielectric constant (Dk1) of the first insulating layer 100. For example, the second relative dielectric constant (Dk2) of the second insulating layer 400 may be 4 to 10.

When a surface area of a main surface having a maximum area among a plurality of surfaces of an antenna is S ($mm^2$) and a relative dielectric constant of an insulating layer where the antenna is disposed is E, a wavelength (A) (mm) of a signal wave generated by the antenna may be expressed by Equation 1 below.

$$\lambda^2 \propto S \times \varepsilon \qquad \text{[Equation 1]}$$

Therefore, in order to generate a signal wave of the same wavelength as that of the first antenna member 300 disposed within the first insulating layer 100 having a low dielectric constant, a second insulating layer 400 having a high dielectric constant may be applied, and an area of the second antenna member 600 disposed within the second insulating layer 400 may be reduced.

Thus, since an overall thickness of the antenna board is reduced by minimizing a thickness T of the second antenna member 600 that is a vertical antenna, the antenna board may be easily applied to a small portable device.

The second circuit wire 500 may be disposed within the second insulating layer 400, and may transfer an electrical signal. The second circuit wire 500 may be disposed in various patterns. The second circuit wire 500 may include a conductive material such as copper (Cu), aluminum (Al), silver (Ag), tin (Sn), gold (Au), nickel (Ni), lead (Pb), titanium (Ti), an alloy thereof, or combinations thereof.

The second circuit wire 500 may include a circuit wire layer 510 and a wire via layer 520.

The circuit wire layer 510 may include a plurality of core wire layers 511, and a plurality of first build-up wire layers 512 and a plurality of second build-up wire layers 513 disposed at both sides of the plurality of core wire layers 511, respectively, along the first direction Z.

The wire via layer 520 may pass through the second insulating layer 400 along the first direction Z to connect circuit wire layers 510 to each other. The wire via layer 520 may include a plurality of core wire via layers 521, and a plurality of first build-up wire via layers 522 and a plurality of second build-up wire via layers 523 disposed at both sides of the core wire via layer 521, respectively, along the first direction Z.

The core wire via layer 521 may pass through the core insulating layer 410 along the first direction Z, and may connect the plurality of core wire layers 511 disposed at both surfaces of the core insulating layer 410 to each other. The plurality of first build-up wire via layers 522 and the plurality of second build-up wire via layers 523 may penetrate the plurality of first build-up insulating layers 420 and the plurality of second build-up insulating layers 430 along the first direction Z, respectively, and may connect the plurality of first build-up wire layers 512, the plurality of second build-up wire layers 513, and the plurality of core wire layers 511 to each other.

However, a structure of the second circuit wire 500 is not limited thereto, and in a case of a coreless board in which the core insulating layer 410 is omitted from the second insulating layer 400, the plurality of core wire layers 511 and the core wire via layer 521 may be omitted.

The second antenna member 600 may be disposed inside the second insulating layer 400, and may be disposed to extend in the first direction Z such that the main surface of the second antenna member faces toward a plane which is 90 degree or less from the main surface of the first antenna member the first antenna member 300. Specifically, the second antenna member 600 may be disposed parallel to the second plane S2 perpendicular to the first plane S1 at which the first antenna member 300 is disposed.

The second antenna member 600 may have a plurality of surfaces (or a plurality of faces), and may have a second main surface 600a having a maximum area among the plurality of surfaces and a second auxiliary surface 600b that is a side surface adjacent to the second main surface 600a and has a smaller area than that of the second main surface 600a. The second main surface 600a may be a vertical surface disposed at the second plane S2, and the second auxiliary surface 600b may be a horizontal surface disposed at the first plane S1.

Hereinafter, a specific structure of the second antenna member will be described in detail with reference to FIGS. 2 and 3.

The second antenna member 600 may include a plurality of conductors 60 stacked in the first direction Z.

The plurality of conductors 60 may include a plurality of conductive pattern layers 610 and a plurality of conductive via layers 620. The plurality of conductive pattern layers 610 and the plurality of conductive via layers 620 may include a conductive material at least one selected from the group consisting of copper (Cu), aluminum (Al), silver (Ag), tin (Sn), gold (Au), nickel (Ni), lead (Pb), titanium (Ti), an alloy thereof, and combinations thereof.

The plurality of conductive pattern layers 610 may be disposed to be spaced apart from each other in the first direction Z. Here, a thickness (t) of the conductive pattern layer 610 extending in the first direction Z may be smaller than a length (L) of the conductive pattern layer 610 extending in a second direction X perpendicular to the first direction Z.

Therefore, an area of the second main surface 600*a* disposed at the second plane S2 of the second antenna member 600 may be larger than that of the second auxiliary surface 600*b* disposed at the first plane S1 of the second antenna member 600.

Specifically, the plurality of conductive pattern layers 610 may include a plurality of core pattern layers 611, and a plurality of first build-up pattern layers 612 and a plurality of second build-up pattern layers 613 disposed each side of the plurality of core pattern layers 611, respectively along the first direction Z.

The plurality of core pattern layers 611 may be disposed at both surfaces of the core insulating layer 410 along the first direction Z. The plurality of first build-up pattern layers 612 and the plurality of second build-up pattern layers 613 may be respectively disposed on the plurality of first build-up insulating layers 420 and the second build-up insulating layer 430 along the first direction Z.

Each of the plurality of conductive via layers 620 may be disposed between adjacent conductive pattern layers 610. The conductive via layer 620 may contact an adjacent conductive pattern layer 610 to transfer an electrical signal.

Specifically, the plurality of conductive via layers 620 may include a core conductive via layer 621 and a plurality of first build-up conductive via layers 622 and a plurality of second build-up conductive via layers 623 disposed at both sides of the core conductive via layer 621 along the first direction Z.

The core conductive via layer 621 may pass through the core insulating layer 410 along the first direction Z, and may connect the plurality of core pattern layers 611 disposed at both surfaces of the core insulating layer 410 to each other. The plurality of first build-up conductive via layers 622 and the plurality of second build-up conductive via layers 623 respectively penetrate the plurality of first build-up insulating layers 420 and the plurality of second build-up insulating layers 430 along the first direction Z, and may connect the plurality of first build-up pattern layers 612 and the plurality of second build-up pattern layers 613 to each other.

However, structures of the plurality of conductive pattern layers 610 and the plurality of conductive via layers 620 are not limited thereto, and may have a form of a coreless board in which the core insulating layer 410, the plurality of core pattern layers 611, and a plurality of core conductive via layers 621 are omitted.

Thus, the antenna board according to an embodiment may easily form the second antenna member 600 that is the vertical antenna by stacking the plurality of conductors 60 in the first direction Z within the second insulating layer 400.

Therefore, since it is not necessary to connect the second antenna member 600 that is the vertical antenna to the first antenna member 300 that is the horizontal antenna with a separate flexible printed circuit (FPC) board or a cable, signal loss may be minimized and manufacturing cost may be reduced.

The protective layer 700 may protect an internal constituent material of the antenna board from external physical and chemical damage or combinations thereof. The protective layer 700 may include a first protective layer 710 and a second protective layer 720. The first protective layer 710 may cover and protect the first insulating layer 100, and the second protective layer 720 may cover and protect the second insulating layer 400. The protective layer 700 may include an insulating material such as an Ajinomoto buildup film (ABF), a photo imageable dielectric (PID), a solder resist, or the combinations thereof.

On the other hand, as shown in FIG. 2, an electronic component (EC) may be disposed outside the second protective layer 720 in a surface-mounted form to form an antenna module.

The electronic component (EC) may be electrically connected to at least one of the circuit wire layers 510 through a conductive adhesive member (CM) disposed in an opening formed at the second protective layer 720.

The electronic component (EC) may include at least one selected from the group consisting of a power management integrated circuit (PMIC), a radio frequency integrated circuit (RFIC), and a passive element. The passive element is a chip type of passive element, and for example, may be a chip type of capacitor, a chip type of inductor, or combinations thereof, but the present disclosure is not necessarily limited thereto.

The conductive adhesive member (CM) may include a low melting point metal (e.g., a solder or the like made of tin (Sn), an alloy including tin (Sn), or combinations thereof) having a lower melting point than copper (Cu).

On the other hand, in the above embodiment, only the second insulating layer at which the second antenna member which is a vertical antenna is disposed is made of the high dielectric constant material, but another embodiment in which the first insulating layer at which the first antenna member that is the horizontal antenna is disposed is also made of a high dielectric constant material is possible.

Hereinafter, an antenna board according to another embodiment will be described in detail with reference to FIGS. 4 and 5.

Figure 4:
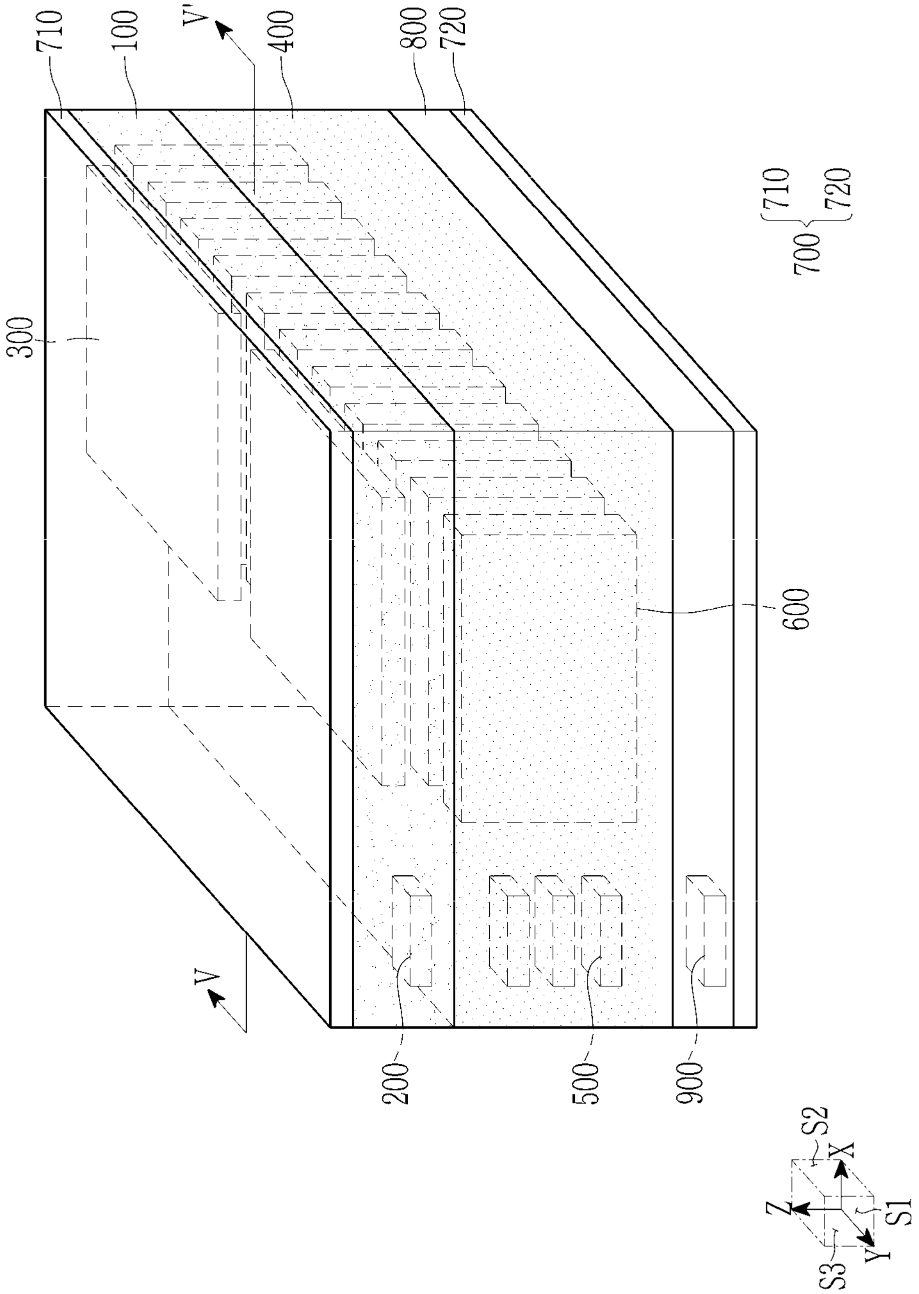
FIG. 4 is a schematic perspective view of an antenna board according to another embodiment.
Figure 5:
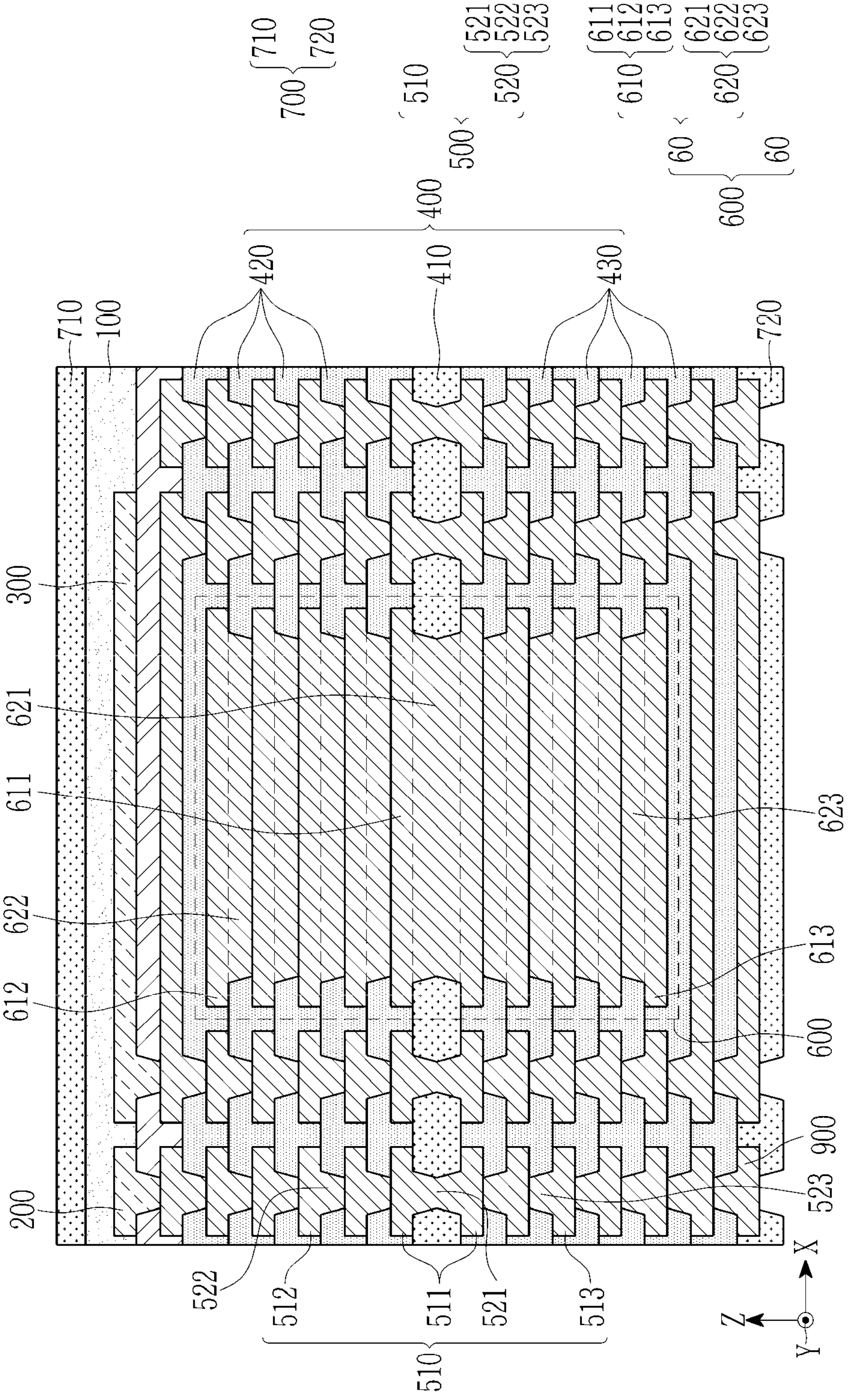
FIG. 5 is a cross-sectional view taken along a line V-V' of FIG. 4.

FIG. 4 is a schematic perspective view of the antenna board according to the other embodiment and FIG. 5 is a cross-sectional view taken along a line V-V' of FIG. 4.

When the other embodiments shown in FIGS. 4 and 5 are compared with the embodiments shown in FIGS. 1 to 3, the other embodiments shown in FIGS. 4 and 5 are substantially the same as the embodiments shown in FIGS. 1 to 3 except that the first insulating layer at which the first antenna member that is the horizontal antenna is disposed is also made of the high dielectric constant material, so that repeated description is omitted.

As shown in FIGS. 4 and 5, the antenna board according to the other embodiment includes the first insulating layer 100, the plurality of first circuit wires 200, the plurality of first antenna members 300, the second insulating layer 400, the plurality of second circuit wires 500, the plurality of second antenna members 600, a third insulating layer 800, a plurality of third circuit wires 900, and the protective layer 700.

The third insulating layer 800, the second insulating layer 400, and the first insulating layer 100 may be disposed from bottom to top along the first direction Z. However, disposition positions of the third insulating layer 800, the second insulating layer 400, and the first insulating layer 100 are not limited thereto, and may be variously modified.

The first circuit wire 200 may be disposed within the first insulating layer 100, the second circuit wire 500 may be disposed within the second insulating layer 400, and the third circuit wire 900 may be disposed within the third insulating layer 800.

The first antenna member 300 may be a horizontal antenna disposed inside the first insulating layer 100 and disposed on the first plane S1 parallel to the upper surface of the first insulating layer 100.

The second antenna member 600 may be disposed parallel to the second plane S2 perpendicular to the first plane S1 at which the first antenna member 300 is disposed.

The first insulating layer 100 and the second insulating layer 400 may be made of a high dielectric constant material having a higher relative dielectric constant than that of the third insulating layer 800. That is, the second relative dielectric constant (Dk2) of the second insulating layer 400 may be the same as the first relative dielectric constant (Dk1) of the first insulating layer 100, and each of the first relative dielectric constant (Dk1) and the second relative dielectric constant (Dk2) may be higher than a third relative dielectric constant (Dk3) of the third insulating layer 800. For example, each of the first relative dielectric constant (Dk1) and the second relative dielectric constant (Dk2) may be 4 to 10, and the third relative dielectric constant (Dk3) may be 3.5 or less.

Thus, the first insulating layer 100 at which the first antenna member 300 that is the horizontal antenna is disposed may be formed of the high dielectric constant material, and the second insulating layer 400 at which the second antenna member 600 that is the vertical antenna may be formed of the high dielectric constant material. Thus, since an overall thickness of the antenna board is reduced by minimizing a thickness of the first antenna member 300 that is the horizontal antenna and the thickness T of the second antenna member 600 that is the vertical antenna, the antenna board may be easily applied to a small portable device.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: first insulating layer | 200: first circuit wire |
| 300: first antenna member | 400: second insulating layer |
| 500: second circuit wire | 600: second antenna member |
| 700: protective layer | |

What is claimed is:

1. An antenna board comprising:

a first insulating layer having a first relative dielectric constant;

at least one first antenna member embedded in the first insulating layer and has a first main surface having a maximum surface area among surfaces of the first antenna member;

a second insulating layer placed adjacent to the first insulating layer and has a second relative dielectric constant higher than the first relative dielectric constant; and at least one second antenna member embedded inside the second insulating layer and has a second main surface having a maximum surface area among surfaces of the second insulating layer and is disposed to such that the main surface of the second antenna member faces toward a plane which is 90 degree or less from the first main surface of the first antenna member.

2. The antenna board of claim 1, wherein the second relative dielectric constant is 6 to 10.

3. The antenna board of claim 1, wherein the first antenna member includes a patch-type antenna.

4. The antenna board of claim 3, wherein the second main surface of the second antenna member is perpendicular to the first main surface of the first antenna member.

5. The antenna board of claim 4, wherein the second antenna member has an auxiliary surface having a surface area that is smaller than that of the second main surface.

6. The antenna board of claim 5, wherein the second antenna member includes a plurality of conductors stacked in a first direction perpendicular to the first main surface.

7. The antenna board of claim 6, wherein the plurality of conductors comprise:

a plurality of conductive pattern layers spaced apart from each other in the first direction; and a plurality of conductive via layers, each of the plurality of conductive via layers disposed between the adjacent conductive pattern layers.

8. The antenna board of claim 7, wherein a thickness of each of the plurality of conductive pattern layers in the first direction is smaller than a length of each of the plurality of conductive pattern layer in a second direction perpendicular to the first direction.

9. The antenna board of claim 1, further comprising:

a first circuit wire embedded inside the first insulating layer and transfers an electrical signal; and a second circuit wire embedded inside the second insulating layer and transfers an electrical signal.

10. An antenna board comprising:

a first insulating layer having a first relative dielectric constant;

at least one first antenna member embedded inside the first insulating layer and has a first main surface with a maximum area;

a second insulating layer placed adjacent to the first insulating layer and has a second relative dielectric constant equal to the first relative dielectric constant;

at least one second antenna member embedded inside the second insulating layer and has a second main surface that has a maximum surface area among surface areas of the second antenna member and is disposed such that the main surface of the second antenna member faces toward a plane which is 90 degree or less from the first main surface of the first antenna member; and a third insulating layer placed adjacent to the first insulating layer or the second insulating layer and has a third relative dielectric constant lower than the second relative dielectric constant.

11. The antenna board of claim 10, wherein the second relative dielectric constant is 6 to 10.

12. The antenna board of claim 10, wherein the first antenna member includes a patch-type antenna.

13. The antenna board of claim 12, wherein the second main surface of the second antenna member is perpendicular to the first main surface of the first antenna member.

14. The antenna board of claim 13, wherein the second antenna member has an auxiliary surface having a surface area smaller than that of the second main surface.

15. The antenna board of claim 13, wherein the second antenna member includes a plurality of conductors stacked in a first direction perpendicular to the first main surface.

16. An antenna board comprising:

a first insulating layer having a first relative dielectric constant;

at least one first antenna member embedded in the first insulating layer and has a first main surface having a maximum surface area among surfaces of the first antenna member;

a second insulating layer placed adjacent to the first insulating layer and has a second relative dielectric constant higher than the first relative dielectric constant; and at least one second antenna member embedded inside the second insulating layer and has a second main surface having a maximum surface area among surfaces of the second insulating layer and is disposed to such that the main surface of the second antenna member faces toward a plane which is 90 degree or less from the first main surface of the first antenna member, wherein the second main surface of the second antenna member is perpendicular to the first main surface of the first antenna member, and wherein the second antenna member has an auxiliary surface having a surface area that is smaller than that of the second main surface.

17. The antenna board of claim 16, wherein the second relative dielectric constant is 6 to 10.

18. The antenna board of claim 16, wherein the first antenna member includes a patch-type antenna.

* * * * *